US005139602A

United States Patent [19]

Suda et al.

[11] Patent Number: 5,139,602

[45] Date of Patent: Aug. 18, 1992

[54] APPARATUS FOR PRODUCING PAVING BLOCKS

[75] Inventors: Shigeo Suda, Osato; Osamu Kodama, Kumagaya; Takumi Tanikawa, Tokoname; Hideyuki Munakata, Tokyo, all of Japan

[73] Assignees: Chichibu Cement Co., Ltd., Yokyo; Inax Corporation, Aichi; ILB Co., Ltd., Tokyo, all of Japan

[21] Appl. No.: 659,954

[22] Filed: Feb. 25, 1991

Related U.S. Application Data

[63] Continuation-in-part of Ser. No. 360,922, Mar. 14, 1989, Pat. No. 4,995,932.

[30] Foreign Application Priority Data

| | | | |
|---|---|---|---|
| Jul. 14, 1987 | [JP] | Japan | 62-175450 |
| Jul. 15, 1987 | [JP] | Japan | 62-176623 |
| Jul. 15, 1987 | [JP] | Japan | 62-176624 |

[51] Int. Cl.$^5$ .............. B29C 39/00

[52] U.S. Cl. .............. 156/423; 156/242; 156/245; 156/293; 156/500; 264/69; 264/71; 264/228; 264/256; 425/215; 425/424; 425/454

[58] Field of Search .............. 156/242, 245, 293, 500, 156/423; 264/69, 71, 228, 256; 425/90, 215, 363, 424, 454, 469

[56] References Cited

U.S. PATENT DOCUMENTS

| | | | |
|---|---|---|---|
| 479,365 | 7/1892 | Houghton et al. | 264/256 |
| 531,842 | 1/1895 | Haddock | 264/256 |
| 708,241 | 2/1902 | Meeker | 425/215 |
| 1,471,990 | 10/1923 | Wert | 264/DIG. 43 |
| 1,629,103 | 5/1927 | Honberger | 264/256 |
| 2,018,192 | 10/1935 | Sexton | 264/71 |
| 2,629,135 | 2/1953 | Johnson | 264/256 |
| 2,700,810 | 2/1955 | Garni | 264/71 |
| 4,265,609 | 5/1981 | Kitahara | 425/424 |
| 4,445,839 | 5/1984 | Crane | 425/424 |

*Primary Examiner*—Caleb Weston
*Attorney, Agent, or Firm*—Browdy and Neimark

[57] ABSTRACT

There is provided an apparatus for producing a paving block comprising a block substrate and a solid top layer selected from a tile-like layer and a cured cement mortar layer firmly bonded onto the upper surface of the block substrate. The apparatus comprises a mortar applicator (21) consisting essentially of a mortar container and a masking bottom board (23) having an opening (24) to be located on the back of a top layer (1-2) or the upper surface of a block substrate (1-1) during application of cement mortar thereon, a clamping plate (25) to be located on the top layer (1-2) placed on the block substrate (1-1) during bonding them, and a scraping frame (26) for scraping excess mortar remaining on the side surfaces of the bonded block. When the apparatus is used to produce a novel paving block comprising a block substrate and a solid top layer having a plane dimension smaller than the substrate, squeeze-out deposits (6) of the cement mortar (7) are further formed around the bonded top layer (1-2).

10 Claims, 4 Drawing Sheets

[PRIOR ART]

APPARATUS FOR PRODUCING PAVING BLOCKS

CROSS-REFERENCE TO RELATED APPLICATIONS

This application is a continuation-in-part of Application Ser. No. 07/360,922 filed as a U.S. National phase application on Mar. 14, 1989, now U.S. Pat. No. 4,995,932 (original PCT filing on Jul. 13, 1988 as PCT/JP88/00698).

BACKGROUND OF THE INVENTION

The present invention relates to an apparatus for producing a paving composite block comprising a block substrate of cement mortar or concrete and a top solid layer such as a tile, stone or cured cement mortar plate firmly bonded onto the upper surface of the block substrate.

A perspective view of an ordinary paving block of rectangular parallelepiped is illustrated in FIG. 9, wherein a ceramic tile is bonded onto a cement concrete block having the same plane dimensions as the tile. Such ordinary tile-bonded blocks have been produced by (1) placing a tile upside-down on the bottom of a casting mold and then casting concrete mortar thereon, or (2) casting concrete mortar into the mold and placing a tile thereon (e.g. Japanese Laid-open Patent Application No. 61-142202). According to the above-mentioned method (1), some dissolved components of concrete mortar flow down and deposit on the tile surface to form efflorescence. According to the method (2), lots of voids remain or are formed at the interface between the tile and block, which largely deteriorate the bonding strength between them. Moreover, durability is also decreased because water such as rain often permeates into the bonded interface through the voids.

Hitherto a systematic apparatus for production of paving blocks has not been used, and such paving blocks have been produced with simple tools, vessels and the like. Thus, it has been impossible or very difficult to efficiently produce such paving blocks having good appearances, uniform qualities and dimensions.

SUMMARY OF THE INVENTION

A main object of the invention is to solve such technical problems and to provide a systematic apparatus for producing paving blocks having uniform qualities and dimensions with precision and high productivity. Other objects and features of the invention will become apparent in the following description.

According to the present invention, there is provided an apparatus for producing a paving block comprising a block substrate and a solid top layer selected from a tile-like layer and a cured cement mortar layer firmly bonded onto the upper surface of the block substrate. The apparatus comprises a mortar applicator (21) consisting essentially of a mortar container and a masking bottom board (23) having an opening (24) to be located on the back of a top layer (1-2) or the upper surface of a block substrate (1-1) during application of cement mortar thereon, a clamping plate (25) to be located on the top layer (1-2) placed on the block substrate (1-1) during bonding them, and a scraping frame (26) for excess mortar. The apparatus is further characterized in that the mortar container is designed to move sideways on the masking board (23) and is equipped with a side wall (22) arranged in the cross-machine direction, whereby cement mortar (7) is uniformly applied by means of the moving side wall (22) through the opening (24) of the masking board (23) onto the back of the top layer or the upper surface of the block substrate; the clamping plate (25) is designed to apply vibration and/or pressurization between the top layer (1-2), cement mortar (7) and block substrate (1-1), whereby the cement mortar is squeezed out and becomes substantially free of voids to firmly bond them; and the scraping frame (26) has a horizontally sectional shape of the block substrate (1-1) and has resilient inside edges, whereby excess mortar (7) remaining on the side surfaces of the bonded block is effectively scraped away by means of the frame (26).

The present apparatus is successfully employed to produce an ordinary paving block having the top layer and block substrate of the same plane dimension as shown in FIG. 9. Also, the apparatus is effectively used to produce a novel paving block comprising a block substrate and a solid top layer having a smaller plane dimension selected from a tile-like layer and a cured cement mortar layer firmly bonded onto the upper surface of the block substrate with lateral margins of 1 to 8 mm wide in horizontal distance from the peripheral edges of the substrate to the top layer and with vertical distance of 5 to 50 mm from the surface of the top layer to the peripheral edge of the substrate, wherein squeeze-out deposits (6) of the cement mortar (7) are further formed around the bonded top layer (1-2).

DETAILED DESCRIPTION OF THE INVENTION

The plane configurations of ordinary paving blocks have a variety of shapes such as rectangles, squares, triangles, other polygons, circles, ovals, and other shapes. The peripheral side lines of the block can be straight, a curved line, a wave-like line or a combination thereof, as far as the blocks can be joined at an interval of a few millimeters when they are installed. The same plane configurations as those ordinary blocks are employed in the novel paving blocks.

The paving blocks are installed on the grounds such as streets and floors at an interval of about 2 to 5 mm. The joint intervals of blocks thus installed are filled with sand (not with jointing paste). The top layer and substrate of the paving block need to be firmly bonded and to be durable against the weight and force loaded on the installed paving blocks. The bonding mortar of the ordinary block produced by the present apparatus is squeezed out and thus becomes substantially free of voids to provide bonding strength sufficient to withstand loads applied on the installed blocks and prevent the bonded interface from permeation of water.

The paving blocks installed on the grounds such as streets receive a variety of heavy loads from cars or the like. As a result, the blocks move to each other by complicated forces applied thereonto and are often inclined together, whereby the shoulder portions of adjacent blocks collide with each other and often break off. Such breakage or fracture of the installed blocks caused by the heavy loads is substantially eliminated by employing the novel paving block comprising a block substrate and a smaller top layer firmly bonded thereon with squeeze-out deposits of cement mortar around the top layer, which novel paving blocks can be successfully produced with the present apparatus.

The embodiments of the present apparatus for production are explained below with respect to the novel paving block having a top layer smaller than the block substrate. The embodiments with respect to the ordinary block are substantially the same as those of the novel block except that the lateral margins and squeeze-out deposits are not formed on the block substrate in the ordinary block.

(1) Configurations, Dimensions, etc. of the Blocks

Figure 1:
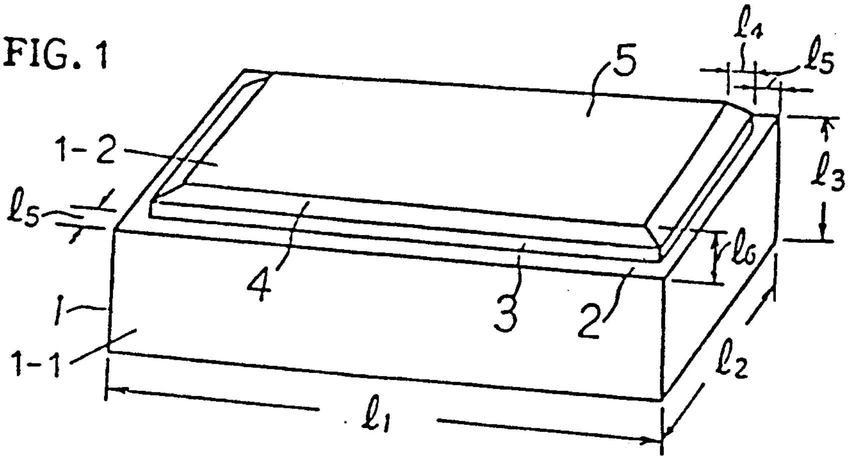
FIGS. 1 and 3 are perspective views showing novel paving blocks produced by the invention.
Figure 2A:
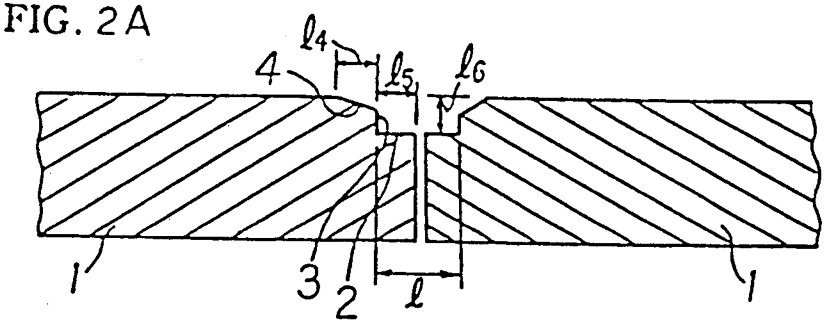
FIGS. 2A and 2B are cross-sectional views of the paving block of FIG. 1.
Figure 2B:
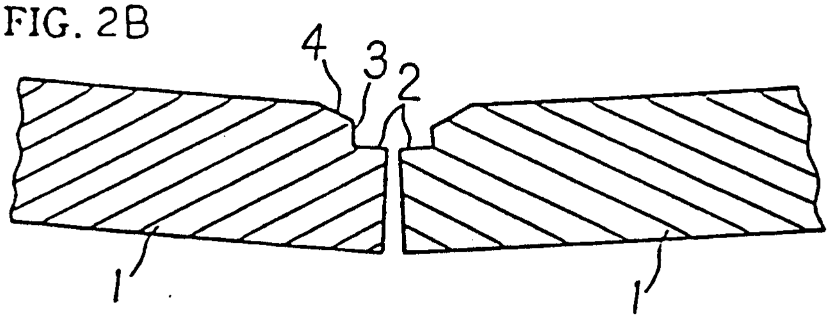
Figure 3:
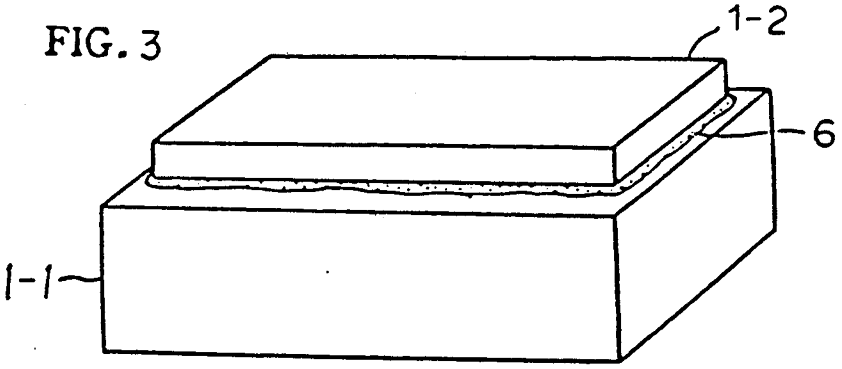
Figure 4A:
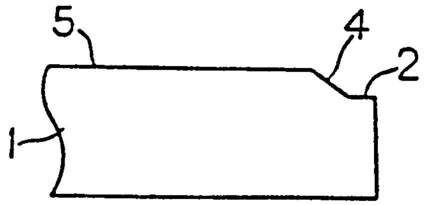
FIGS. 4A to 4D are schematic partial side views showing configurations of the blocks.
Figure 4B:
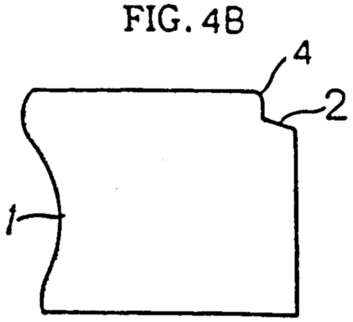
Figure 4C:
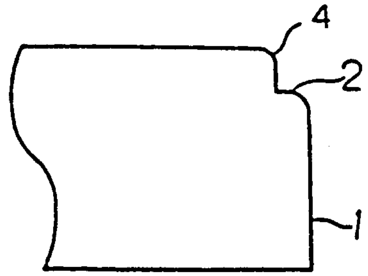
Figure 4D:
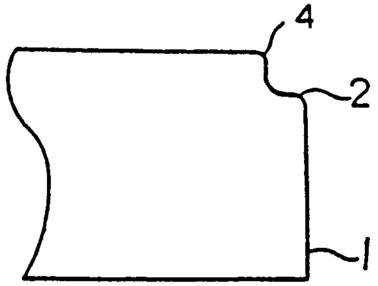

FIG. 1 shows a perspective view of a paving block 1 composed of a block substrate 1-1 and a cement mortar top layer 1-2 according to the present invention. FIG. 2A shows a cross-sectional view of adjacently arranged two blocks of FIG. 1. FIG. 2B is a schematic cross-sectional view of the blocks of FIG. 2A which are inclined together when heavy weight is loaded from cars or the like. FIG. 3 shows a perspective view of the present paving block composed of a block substrate 1-1 and a tile-like top layer 1-2 bonded to the substrate with adhesive cement mortar, wherein squeeze-out deposits 6 of the cement mortar is observed around the top layer.

In FIGS. 1 and 2A, the configurations and dimensions of the block 1 are shown, wherein $l_1$ is a lateral length, $l_2$ is a side length and $l_3$ is a height of the block substrate. In general, the length of $l_1$ or $l_2$ is about 8 to about 50 cm. The height $l_3$ is at least about 3 cm and in the range of about 3 to 20 cm, generally at least about 4 cm and in the range of about 4 ~ 20 cm, preferably about 4 ~ 15 cm, and normally about 4 ~ 10 cm. The numeral 2 shows lateral margins on the surface of the block substrate 1-1, the width or horizontal distance $l_5$ from the peripheral edges being about 1 ~ 8 mm and normally about 1 ~ 5 mm. The lateral margin 2 can be substantially horizontal or can be inclined in a sloping or round fashion as shown in FIG. 4. The numeral 3 shows a vertical side of the top layer 1-2 and the 4 shows a preferred embodiment of beveling portions or round corners of the top layer, the horizontal distance $l_4$ of the beveling or round corners being substantially zero to a few millimeters. The numeral 5 shows a surface of the top layer 1-2, the vertical distance $l_6$ from the surface 5 of the top layer to the peripheral edge of the margin 2 of the substrate 1-1 being about 5 ~ 50 mm and normally about 5 ~ 30 mm. Incidentally as shown in FIG. 2A, the paving blocks are installed on the ground at an interval of about 2 ~ 5 mm, and thus the distance l between the adjacent top layers of the installed blocks is about 4 mm or more. The intervals and distances l are filled with sand, when the blocks are installed.

FIGS. 4A through 4D are partial side views of the paving blocks 1 showing the examples of configurations of the round corners (or beveling) 4 and margins 2 of the blocks. These configurations are also as effective as those shown in FIGS. 1 and 3.

Figure 5:
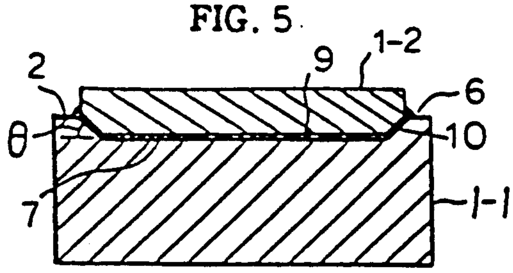
FIGS. 5 and 6 are cross-sectional views showing embodiments of the blocks.
Figure 6:
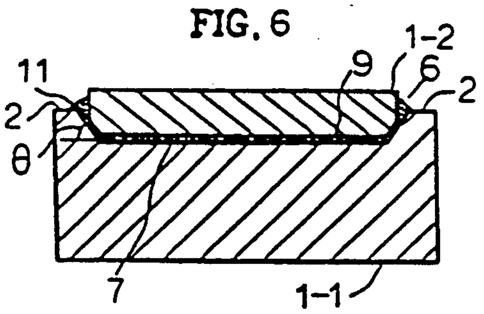

FIG. 5 is a cross-sectional view of a paving block according to the present invention, showing a tile-like top layer 1-2 is placed and bonded onto a dish-like depression 9 of a block substrate 1-1 with an adhesive cement mortar layer 7 between the top layer and the depression. The upper surface of the block substrate comprises peripheral margins 2, depression 9, and slopes 10 which connect the depression to the margins. The angle $\theta$ of the slope is generally about 30 ~ 60 degrees and typically about 45 degrees to the horizontal direction. Such slopes are useful to receive the top layer in the proper position of the depression. The slopes, however, are not essential, and the depression can be connected to the margins with vertical walls. The depression 9 has such a configuration as to receive the back of the tile-like top layer and the adhesive cement mortar. FIG. 6 shows a cross-sectional view of another paving block, wherein the depression 9 of the block substrate 1-1 has some spaces 11 at the slopes 10 for holding squeeze-out deposits 6 of the adhesive cement mortar. The depth of the depression 9 is generally in the range of about 1.5 ~ 10 mm and normally about 2 ~ 5 mm. Incidentally, the depression 9 can have some cut-outs at the corners or walls of the depression to readily drive out some excess adhesive cement mortar and to prevent the corners or walls from fracture.

Figure 7:
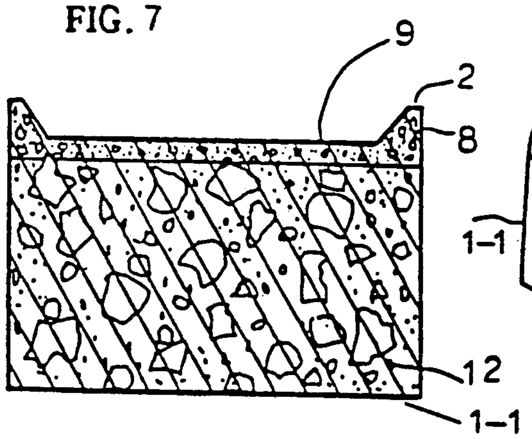
FIG. 7 is a cross-sectional view showing an embodiment of a substrate of the block.
Figure 9:
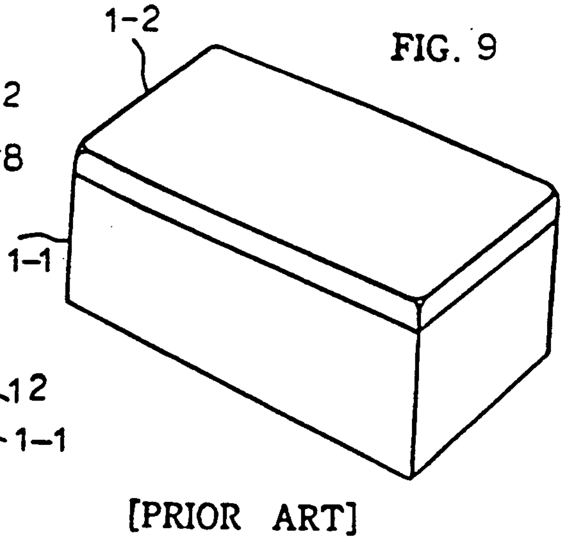
FIG. 9 is a perspective view of an ordinary block.

FIG. 7 shows a cross-sectional view of a block substrate 1-1 similar to those shown in FIGS. 5 and 6, wherein the lower major portion of the substrate comprises cement concrete 12 containing comparatively coarse aggregate and the upper surface of the substrate is substantially covered with cured cement mortar 8 containing comparatively fine aggregate, whereby the shoulders including the margins 2 of the substrate is provided with good appearances and the tile-like top layer can be readily bonded to the substrate without interruption of the coarse aggregate. The cured cement mortar layer has a thickness of about 2 ~ 10 mm and normally about 3 ~ 4 mm. In FIG. 7, the cured mortar layer 8 provides the depression 9 and margins 2 of the block substrate. Such cured cement mortar layers, however, can also be employed in other block substrates as shown in FIGS. 1 and 3.

(2) Materials for Producing the Blocks

The term cement means an inorganic hydraulic material and represented by portland cement, alumina cement, fly ash cement, blast furnace cement, slag cement, and mixtures thereof. In general, portland cement is used. Conventional aggregate used for cement is also employed in the present invention, such as sand, slag and gravel. The cement material such as mortar and concrete can be colored as necessary.

As to general sizes of aggregate, cement concrete for the block substrate may contain comparatively coarse aggregate, the sizes of which are those of remaining on 5 mm-square screen and normally those of remaining on 5 mm-square screen and passing through 20 mm-square screen. The sizes of aggregate for a cement mortar top layer 1-2 or a cured cement mortar 8 covering cement concrete substrate are those passing through 5 mm-square screen and preferably through 4 mm-square screen. The sizes of fine aggregate for the adhesive cement mortar 7 are those passing through 1.2 mm-square screen and preferably through 1 mm-square screen.

Incidentally, cement mortar containing such fine aggregate can be used as adhesive cement mortar. It is preferred that the adhesive cement mortar comprises a major amount of the cement mortar and a minor amount (e.g. about 40～5% by weight) of an organic adhesive polymer such as styrene butadiene rubber (SBR) latex or acrylic polymer emulsion.

The tile-like top layers 1-2 include, for example, ceramic tile produced from minerals, and similar sintered plates produced from inorganic substances; natural stone plates of granite, marble, slate, etc.; and artificial stone plates such as cement boards and resin-modified cement boards. The tile-like layers, however, are not restricted to those shown above, as far as they have good bonding properties, sufficient strength and good appearances.

(3) Apparatus and Steps for Producing Paving Blocks

Figure 8A:
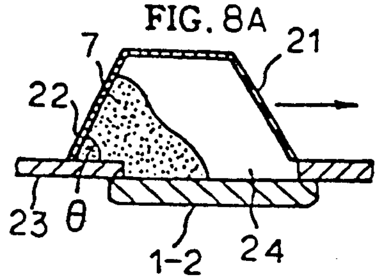
FIGS. 8A through 8E are cross-sectional views showing apparatus and steps for producing the block.
Figure 8B:
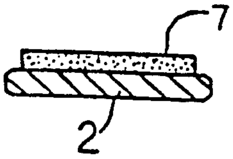

FIGS. 8A through 8E are cross-sectional views showing apparatus, embodiments and steps for bonding a tile-like top 1-2 layer onto a block substrate 1-1. FIG. 8A shows a mortar applicator consisting essentially of a mortar container (e.g. a hopper) and a masking bottom board 23. The mortar container moves sideways (cf. arrow) on a masking board 23 and over the masked tile-like top layer 1-2. The mortar container is equipped with a side wall 22 (preferably a side wall comprising a slant wall 22 sloped inwards and angled at about 30～60 degrees shown by $\theta$ to the horizontal direction) arranged in the cross-machine direction and in contact with the masking board, whereby adhesive cement mortar 7 is uniformly applied through the opening 24 of the masking board 23 by the moving side wall onto the back of the top layer (cf. FIG. 8B). The adhesive mortar is applied in the thickness of about 2～5 mm. The applicator 21 can also be used to apply the mortar onto the upper surface of the block substrate 1-1 with or without the depression 9.

Figure 8C:
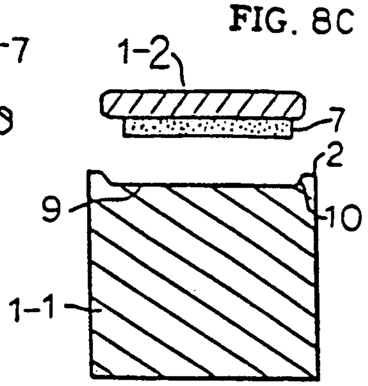

The mortar-backed top layer (cf. FIG. 8B) is turned upside down and is placed on the upper surface of the substrate 1-1 (cf. FIG. 8C). Vibration (e.g. 1000 to 10,000 cycles/minute) and/or pressurization (e.g. 0.1 to 0.5 Kgf/square cm) and preferably the both actions are applied onto the top layer by means of a clamping plate device 25 placed on the top layer, whereby the adhesive cement mortar is squeezed out and often flowed out onto the side surfaces of the substrate (cf. FIG. 8D). The excess mortar 7 remaining on the side surfaces is effectively scraped away by means of a frame 26 having a horizontally sectional shape of the block substrate 1—1 (cf. FIG. 8E). Incidentally, the scraping frame 26 can be composed of a metal frame having inside edges of a resilient material.

(4) Embodiments of the Apparatus

The apparatus comprising a mortar applicator 21, a clamping plate 25 and a scraping frame 26 described above and shown in FIGS. 8A, 8D and 8E is self-explanatory to those skilled in the art, but is schematically explained below with reference to schematic side views FIGS. 10, 11, and 12.

Figure 10:
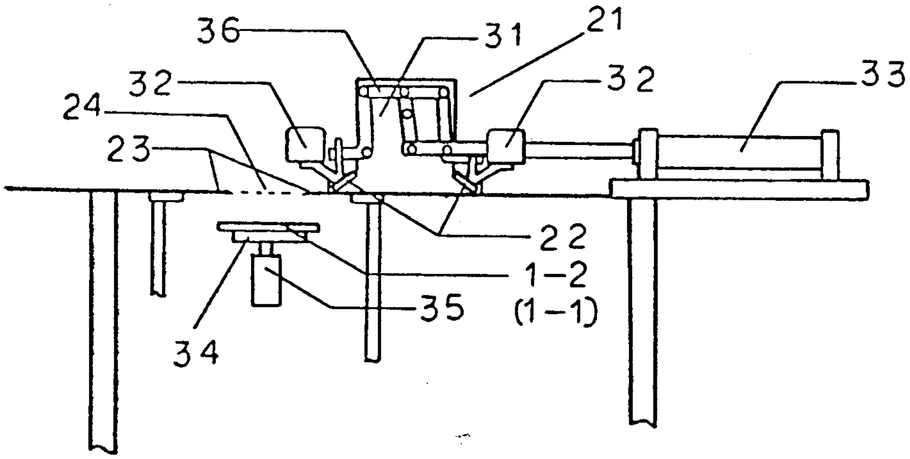
FIG. 10 is a side view showing an embodiment of a mortar applicator.

FIG. 10 illustrates an embodiment or example of a mortar applicator 21 as shown in FIG. 8A, consisting essentially of a mortar container 31 (e.g. a hopper) and a masking bottom board 23 having an opening 24. The mortar container 31 is equipped with a side wall 22 (preferably a slant wall 22 sloping inwards) arranged in the cross-machine direction and in contact with the masking board 23. The mortar container 31 moves on the masking board 23 forward and backward in the machine direction by means of a moving means 33 for moving the container 31 sideways. The applicator 21 may include a supporting table 34 and a lifting means 35 to locate the top layer 1-2 or the block substrate 1-1 under the opening 24 of the masking board 23, and may optionally include a vibrator 32 for a side wall 22 and a link means 36 for moving or adjusting the positions of the side walls.

Figure 8D:
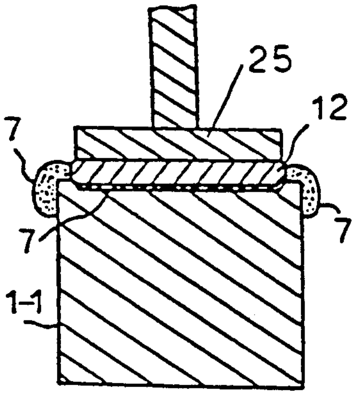
Figure 11:
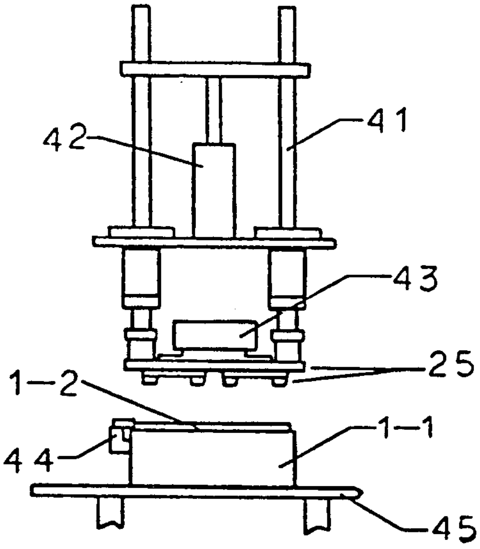
FIG. 11 is a side view showing an embodiment of a clamping plate device.

FIG. 11 illustrates an embodiment or example of a clamping plate device as shown in FIG. 8D, comprising a clamping plate 25. Pressurization is given by means of a downstroke press means 42 and guide shafts 41 and vibration is given by means of a vibrator 43, to the clamping plate 25 and thus to the top layer 1-2 and block substrate 1-1 having cement mortar therebetween. The top layer and block substrate to be bonded are placed on a supporting table 45. The supporting table may be equipped with a positioning guide 44 for the top layer and substrate.

Figure 8E:
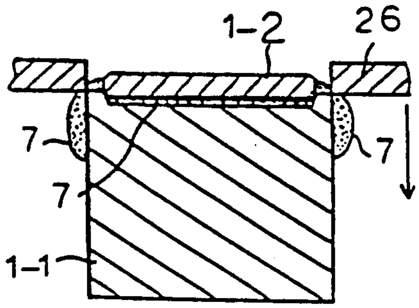
Figure 12:
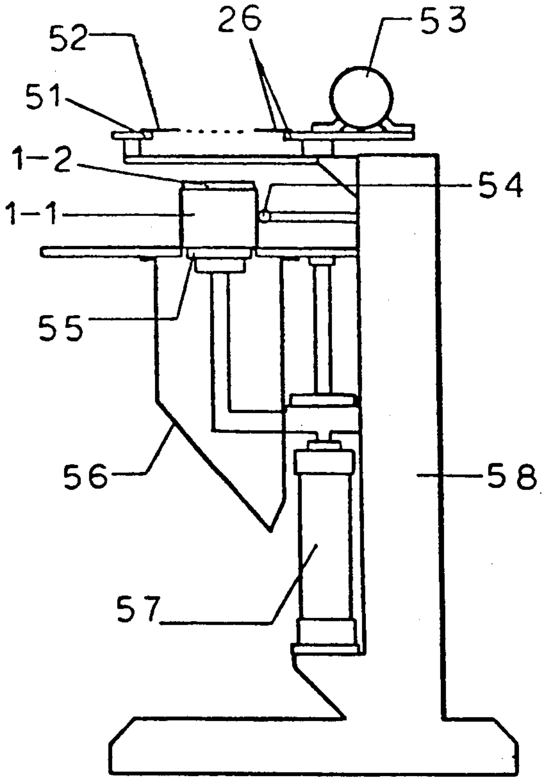
FIG. 12 is a side view showing an embodiment of a scraping frame device.

FIG. 12 illustrates an embodiment or example of a scraping frame device 26 for scraping excess mortar as shown in FIG. 8E, comprising an outside frame 51 and resilient inside edges 52. The frame device is mounted on a stand 58. A bonded block having excess cement mortar on the side surfaces thereof is placed on a supporting table 55, and goes up and down through the scraping frame 26 by means of a lifting means 57. The frame device may be optionally equipped with a vibrator 53 for the scraping frame, a covering means 56 for scraped mortar, and a positioning guide 54 for the bonded block.

What is claimed is:

1. An apparatus for producing a paving block comprising a block substrate and a solid top layer selected from a tile layer and a cured cement mortar layer bonded to the upper surface of the block substrate, the plane dimensions of the top layer being substantially identical with or smaller than those of the block substrate, which apparatus comprises a mortar applicator (21) consisting essentially of a mortar container and a masking bottom board (23) having an opening (24) to be located on the back of a top layer (1-2) or the upper surface of a block substrate (1-1) during application of cement mortar thereon, a clamping plate (25) to be located on the top layer (1-2) placed on the block substrate (1-1) during bonding them, and a scraping frame device (26) for excess mortar; wherein the mortar container is designed to move sideways on the masking board (23) and is equipped with a side wall (22) arranged in the cross-machine direction, whereby cement mortar (7) is uniformly applied by means of the moving side wall (22) through the opening (24) of the masking board (23) onto the back of the top layer or the upper surface of the block substrate; wherein the clamping plate device (25) is designed to apply vibration and/or pressurization between the top layer (1-2), cement mortar (7) and block substrate (1-1), whereby the cement mortar is squeezed out and becomes substantially free of voids to firmly bond them; and wherein the scraping frame (26) has a horizontally sectional shape of the block substrate (1-1), whereby excess mortar (7) remaining on the side surfaces of the bonded block is effectively scraped away by means of the frame (26).

2. The apparatus according to claim 1, in which the side wall is movable in contact with the masking board.

3. The apparatus according to claim 1, in which the scraping frame has resilient inside edges.

4. The apparatus according to claim 3, in which the side wall is movable in contact with the masking board.

5. The apparatus according to claim 3, in which the side wall (22) of the mortar container comprises a slant wall sloping inwards.

6. The apparatus according to claim 5, in which the slant wall (22) is angled at 30 to 60 degrees to the horizontal direction.

7. The apparatus according to claim 1, in which the side wall (22) of the mortar container comprises a slant wall sloping inwards.

8. The apparatus according to claim 7, in which the slant wall (22) is angled at 30 to 60 degrees to the horizontal direction.

9. The apparatus according to claim 7, in which the slant wall is movable in contact with the masking board.

10. The apparatus according to claim 9, in which the slant wall (22) is angled at 30 to 60 degrees to the horizontal direction.

* * * * *